Jan. 1, 1952  G. A. TINNERMAN  2,581,312
LOCK NUT
Filed Oct. 14, 1948

Inventor
GEORGE A. TINNERMAN
By
H. G. Lombard
ATTORNEY

Patented Jan. 1, 1952

2,581,312

UNITED STATES PATENT OFFICE 2,581,312

LOCK NUT

George A. Tinnerman, Cleveland, Ohio, assignor to Tinnerman Products, Inc., Cleveland, Ohio, a corporation of Ohio Application October 14, 1948, Serial No. 54,535

2 Claims. (Cl. 151—21)

This invention relates in general to improvements in sheet metal lock nuts and deals more particularly, with an improved sheet metal nut construction which is adapted to provide the strength and durability of a conventional threaded nut together with an automatic self-locking action in tightened threaded engagement with a bolt or screw in applied fastening position.

A primary object of the invention is to provide an improved sheet metal lock nut construction in which the thread portion is defined by a continuous or imperforate tubular hub, or the like, having a series of internal thread convolutions for threadedly engaging a plurality of threads on the bolt or screw with substantially the strength and durability of a conventional threaded nut while otherwise effecting an automatic self-locking action with the bolt in tightened fastening position in the manner of a spring nut.

Another object of the invention is to provide such a sheet metal lock nut in which the continuous tubular hub providing the thread portion for a series of thread convolutions, as aforesaid, is formed on an arched or bowed base portion which, when compressed in the tightened tensioned position of the nut, produces a pronounced upward axial thrust on the screw threads within the hub to effect an automatic spring locking action in the manner of a spring nut.

Further objects and advantages and other new and useful features in the construction, arrangement and general combination of elements of the invention will be readily apparent as the following description proceeds with reference to the accompanying drawings, for purposes of illustration but not of limitation, in which like reference characters designate like parts throughout, and in which.

Figure 1:
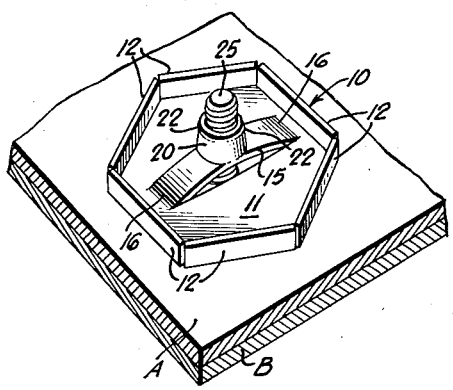
Fig. 1 is a perspective view showing a sheet metal lock nut in accordance with the invention as applied to tightened fastening position on a bolt or screw.

Referring now, more particularly, to the drawings, the improved lock nut of the invention is shown provided in a preferred form approximating a standard hexagonal nut design and usable in the same general manner. The thread portion of the nut is defined by a central tubular hub which is of a relatively simple, compact construction that may be readily embodied in any similar lock nut design having any selected number of wrench engaging faces, or, in an anchor nut provided with suitable attaching means, or, as integral nut elements provided in multiple in a tapped plate, panel or the like, as may be readily understood.

The lock nut in the hexagonal nut design shown comprises an advantageous one-piece fastener which includes a thread portion for providing an automatic self-locking action on a bolt or screw with the strength and durability of a standard nut, and a relatively large base providing an effective bearing surface which eliminates the need for separate spanner washers, or the like. The present lock nut design, accordingly, is particularly suited for a wide range and variety of uses as a lock nut of general utility for securing heavy parts and assemblies subject to rough handling and usage.

In crating applications, and the like, in which the nut is tightened against a wood surface, the nut is effectively employed without the use of bearing washers and provides a strong, durable and reliable assembly in which the parts remain tightly secured under any normal conditions. Occasionally, shrinkage of the wood takes place due to drying under abnormal conditions or aging over an extended period of time which results in a contraction of the wood away from the nut and consequently, the usual standard nut or lock nut becomes loosely disposed on the bolt and subject to further loosening and unintended removal. The lock nut of this invention, however, provides a positive locking action directly on the bolt or screw under a prevailing torque which prevents any relative turning whatsoever so that the nut is fixedly locked on the bolt and will not back off even though a slight clearance may develop between the nut and the adjacent work as a result of shrinkage due to drying or aging of a wood part, as aforesaid, or for any other cause of such clearance.

The lock nut is readily constructed in any design from an inexpensive blank of sheet metal which may be advantageously provided from standard sheet metal strip stock with little loss or waste of material. Any suitable sheet metal may be employed, preferably cold rolled metal or low carbon steel which may be worked and stretched to provide a drawn tubular hub or protuberance on a base defined by the body of the sheet metal blank. The thickness of the sheet metal for any particular fastener is selected according to service requirements and the predetermined size and design of the lock nut in a manner whereby the sheet metal base of the nut will be of suitable strength and thickness after the tubular hub has been drawn and stretched therefrom in the size and wall thickness required for use with any selected size of bolt or screw.

Figure 4:
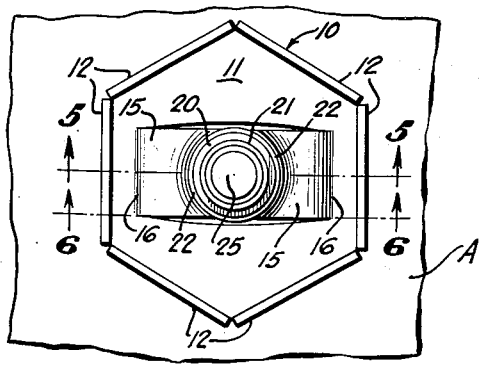
Fig. 4 shows the nut in a top plan view as applied to fastening position on a cooperating bolt or screw.
Figure 7:
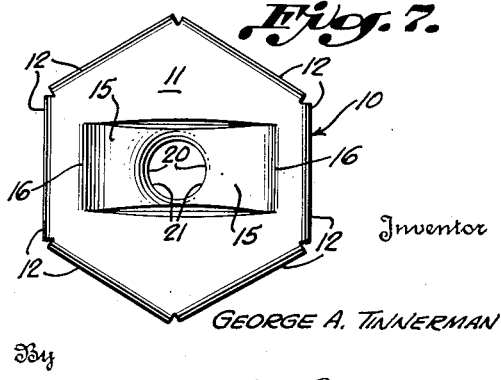

In the present example, a sheet metal section thus provided is formed by suitable slitting, punching and bending operations into a hexagonal nut design 10 comprising a body or base 11 and adjoining peripheral flanges 12 which are bent upwardly from said base to define tool engageable surfaces. As best seen in Figs. 4 and 7, the base or body 11 of the fastener is provided with spaced, slightly outwardly curved slits to define a continuous strip or bridge portion 15 having its ends integral with the fastener base 11 at the junctions 16. The strip portion carries an integral upstanding hub 20 which is tapped to provide a series of thread convolutions 21 for threadedly engaging a bolt or screw with which the fastener is intended to be used. The strip or bridge portion 15 is arched or bowed with the tubular hub 20 located at the approximate midportion of the said strip 15 at the apex of the arch or bow therein.

In general, this arrangement of the hub 20 on the strip 15 and the operation for forming the same is such that the spaced slightly outwardly curved slits defining the strip 15 free said strip along its longitudinal edges so that said strip may be readily worked both longitudinally and transversely as necessary to draw the tubular hub 20 therefrom. The sheet metal is of predetermined thickness for this purpose, as aforesaid, and in such drawing operation the strip portion 15 is gradually stretched while the added material defined by the slightly outwardly curved longitudinal side edges thereof shrinks slightly inwardly, as seen in Fig. 7, to permit the drawing of the tubular hub 20 as required. Simultaneously, the strip or bridge portion 15 is formed in the generally arched or bowed configuration thereof, shown in Fig. 2, with the tubular hub 20 disposed at the apex of such arch or bow in said strip.

The operation for drawing the tubular hub otherwise is such that the outer periphery of the hub assumes a slightly cone-shaped formation having its outer surface tapering gradually inwardly toward the outer end of the hub while the inner wall surface is substantially uniformly cylindrical. Thus the wall thickness or cross-section of the tubular hub 20 is of greatest thickness adjoining the strip portion 15 and gradually diminishes in wall thickness outwardly toward the free end of the hub.

With the nut body thus provided, the tubular hub 20 is tapped to provide a series of internal threads 21 extending along this wall of gradually diminishing thickness or cross-section. Accordingly, the threads 21 on the wall adjacent the outer end of the tubular hub are provided on the upper wall portion $a$ which is of less thickness and cross-section and consequently of less strength than the lower wall portion $b$ at the lower end of the tubular hub 20 adjoining the strip portion 15, as illustrated in Figs. 2 and 5.

The lock nut as thus provided is complete in itself and requires no auxiliary locking elements or other vibration-resisting devices in its automatic self-locking action with a cooperating bolt or screw. The lock nut is thus one of general utility and is adapted to secure any two or more parts as, for example, in the typical assembly of Figs. 5 and 6, in which the nut is shown in tightened fastening position on a bolt 25 connecting a pair of superposed apertured plates A, B.

Figure 2:
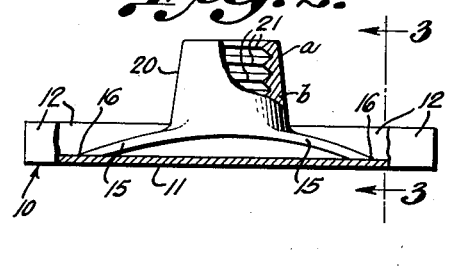
Fig. 2 is a sectional view of the improved lock nut showing the general formation of the tubular hub portion of the nut and the thread convolutions therein, represented partly in section.
Figure 3:
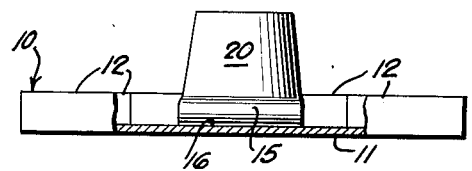
Fig. 3 is a sectional view of the nut as taken along line 3—3, looking in the direction of the arrows.

When initially applied to the bolt or screw, the normal formation of the lock nut is substantially as shown in Fig. 2 with the bowed or arched strip portion 15 in untensioned condition and the threads 21 in uniform symmetrical relation for easily and quickly threading onto the bolt to the point of clamping engagement with the adjacent part A to be secured. The nut is then tightened by a suitable tool applied to the tool engaging flanges 12 of the nut to draw the nut tightly against the secured parts and otherwise effect an automatic self-locking of the nut in such tightened position.

Figure 5:
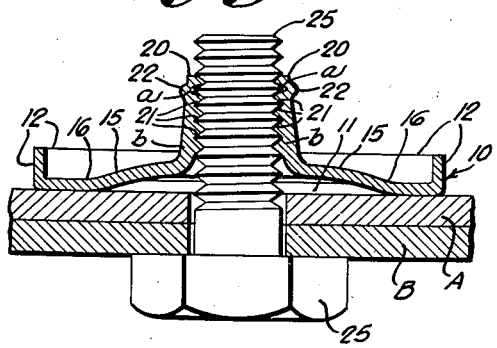
Fig. 5 is an enlarged sectional view of Fig. 4 as seen along line 5—5, looking in the direction of the arrows, showing the hub of the nut in section as slightly deformed in tightened fastening position.
Figure 6:
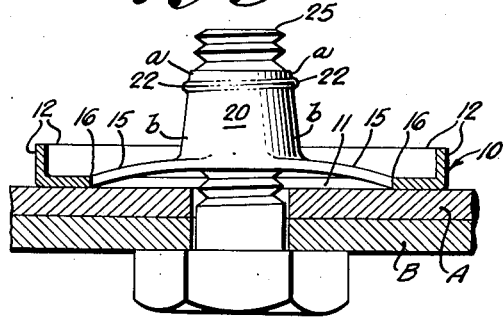
Fig. 6 is a similar sectional view of Fig. 4 as seen along line 6—6, looking in the direction of the arrows, showing the hub of the nut in side elevation as slightly deformed in tightened fastening position; and, Fig. 7 is a bottom plan view of the nut per se.

In the tightening of the nut, the strip or bridge portion 15 is moved from its normal untensioned arched or bowed configuration, shown in Fig. 2, to the flattened or compressed condition seen in Figs. 5 and 6, whereby the sections of said strip 15 at diametrically opposite sides of the hub 20 necessarily exert radially inward forces on said tub 20 which causes the hub to be deformed slightly inwardly at the junctions of said strip sections with the hub, and accordingly, the adjacent thread convolutions within the hub, likewise, are deformed and thereby have a pronounced drag or binding action with the bolt thread at opposite sides of the bolt. The arrangement, otherwise, is such that said strip portion is highly tensioned and exerts a constant outward or upward axial thrust on the threads 21 within the tubular hub 20 which is transmitted to the threads of the bolt to provide an effective thread lock thereon under continuous spring tension in the manner of a spring nut.

Simultaneously, in the final tightening of the nut, the tightening force is such that the thinner wall portion $a$ of the tubular hub at its outer end, as aforesaid, is forced to collapse slightly into an outward annular deformation 22, resembling a slight outward corrugation as seen in Figs. 5 and 6. This deformation of said thinner wall portion $a$ causes the internal thread convolutions thereon to be compressed and jammed together to a spacing less than normal with the result that these deformed thread convolutions create a permanent drag or binding engagement on the underside of the bolt thread. The binding engagement or drag thus created provides a permanent positive lock of the nut in direct contact with the bolt and when this permanent locking action is effected, it is maintained independently of the parts secured by reason of said deformed thread portion. Consequently, the nut will not back off of the bolt or screw even though a slight clearance may develop between the nut and the adjacent work as, for example, might possibly occur as a result of shrinkage due to drying or aging of a wood part, as hereinbefore mentioned.

It will be understood, accordingly, that the positive locking action of the improved lock nut takes place as a result of the combined coacting forces of the upward axial spring lock provided by the compressed arched or bowed strip portion 15 and the permanent drag provided on the underside of the bolt thread in the region of the deformed thread portion $a$ within the tubular hub together with the drag provided by the deformed lower thread portions in the regions of the junctions of the strip sections 15 with the hub in the flattened or compressed condition of said strip sections 15 as seen in Fig. 5. The entire locking action is effected automatically without the use of auxiliary locking devices of any nature and the combined locking forces provide a positive and durable locking of the nut directly to the bolt or screw which is not subject to loosening as a result of vibration or shock under the most severe service conditions.

It will be appreciated, further, that the tubular hub construction in a self locking sheet metal nut of this character is highly advantageous and marks an important improvement in that the tubular hub defines a series of internal thread convolutions on a solid and continuous tubular wall which is adapted to provide the strength and durability of a standard threaded nut together with the aforesaid automatic, positive self-locking action with a bolt or screw in the manner of a spring nut.

While the invention has been described in detail with a specific example, such example is intended as an illustration only inasmuch as various changes in the construction and design of the fasteners within the scope of the instant disclosure are fully contemplated.

What is claimed is:

1. A nut structure comprising a sheet metal body providing a base, a portion of said base being provided with spaced slits forming a continuous strip having its ends integral with said base, said continuous strip projecting bodily upwardly out of the plane of said base, said continuous strip comprising an upstanding tubular hub intermediate a pair of diametrically opposite sections of said continuous strip joined to said tubular hub at opposite portions of the lower end of said tubular hub, said tubular hub having an internal thread.

2. A nut structure comprising a sheet metal body providing a base, a portion of said base being provided with spaced slits forming a continuous strip having its ends integral with said base, said continuous strip projecting bodily upwardly out of the plane of said base, said continuous strip comprising an upstanding tubular hub intermediate a pair of diametrically opposite sections of said continuous strip joined to said tubular hub at opposite portions of the lower end of said tubular hub, said tubular hub having an internal thread and a generally cone-shaped outer surface tapering inwardly toward the upper free end of said hub, whereby the wall of said hub is of gradually diminishing thickness toward the free end of said hub.

GEORGE A. TINNERMAN.

REFERENCES CITED

The following references are of record in the file of this patent:

UNITED STATES PATENTS

| Number | Name | Date |
| --- | --- | --- |
| 2,026,859 | Baynes | Jan. 7, 1936 |
| 2,063,181 | Miller | Dec. 8, 1936 |
| 2,252,904 | Todd | Aug. 19, 1941 |
| 2,287,691 | Marchou | June 23, 1942 |
| 2,393,054 | Morehouse | Jan. 15, 1946 |
| 2,394,491 | Schaper | Feb. 5, 1946 |
| 2,401,672 | Tinnerman | June 4, 1946 |

FOREIGN PATENTS

| Number | Country | Date |
| --- | --- | --- |
| 64,854 | Denmark | Oct. 7, 1946 |